US009517656B2

(12) United States Patent
von Roenne et al.

(10) Patent No.: US 9,517,656 B2
(45) Date of Patent: Dec. 13, 2016

(54) RIM INSERT SYSTEM

(71) Applicant: Ford Global Technologies, LLC, Dearborn, MI (US)

(72) Inventors: Jens von Roenne, Overath NRW (DE); Claudio Santos, Cologne NRW (DE); Franziska Schmitz, Cologne NRW (DE); Andrea Piroddi, Cologne NRW (DE)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 265 days.

(21) Appl. No.: 14/186,817

(22) Filed: Feb. 21, 2014

(65) Prior Publication Data
US 2014/0239702 A1 Aug. 28, 2014

(30) Foreign Application Priority Data

Feb. 22, 2013 (DE) .................. 10 2013 202 988

(51) Int. Cl.
*B60B 7/08* (2006.01)
*B60B 7/04* (2006.01)
*B60B 7/06* (2006.01)

(52) U.S. Cl.
CPC . *B60B 7/08* (2013.01); *B60B 7/04* (2013.01); *B60B 7/065* (2013.01); *B60B 2900/351* (2013.01)

(58) Field of Classification Search
CPC ................ B60B 7/08; B60B 7/04; B60B 7/00; B60B 7/065; B60B 2900/351

(Continued)

(56) References Cited

U.S. PATENT DOCUMENTS 2,022,153 A * 11/1935 Rogers .................... B60B 11/06
188/218 R
3,018,856 A * 1/1962 Lyon ..................... F16D 65/827
188/264 R (Continued)

FOREIGN PATENT DOCUMENTS

DE 202009013418 U1 2/2011
DE 102011107064 A1 3/2012
EP 1992500 A1 11/2008

OTHER PUBLICATIONS

German Office Action for DE 10 2013 202 988.8, English Machine Translation attached to original, German Office Action Generated on Sep. 3, 2013, All together 12 Pages.

*Primary Examiner* — S. Joseph Morano
*Assistant Examiner* — Jean Charleston
(74) *Attorney, Agent, or Firm* — Jason Rogers; Brooks Kushman P.C.

(57) ABSTRACT

The invention relates to a rim insert system for a rim having at least one opening which forms a rim channel that tapers in a funnel-like manner, and at least one funnel-like rim insert releasably engaged in the opening. The rim insert has a peripheral catch edge which engage behind an internally arranged opening edge of the rim channel in an inserted position. A first catch projection is in abutment with an inclined portion of the opening edge. The inclined portion and the inner face of the rim channel are disposed at an angle of approximately from 200°-240° in cross-section. A second catch projection is substantially diametrically opposed to the first catch projection and engages behind the opening edge in a positive-locking manner. The inner face of the rim channel and the opening edge form an angle of approximately from 270° to 290°.

7 Claims, 5 Drawing Sheets

(58) Field of Classification Search
USPC .......................................... 301/37.31, 37.102
See application file for complete search history.

(56) References Cited

U.S. PATENT DOCUMENTS

| | | | | |
|---|---|---|---|---|
| 4,503,944 | A * | 3/1985 | Burckhardt | B60B 7/00 188/218 A |
| 4,593,953 | A * | 6/1986 | Baba | B60B 7/00 301/37.101 |
| 5,020,861 | A * | 6/1991 | Gorges | B64C 25/36 188/264 W |
| 7,314,255 | B2 * | 1/2008 | Wang | B60B 7/10 301/37.102 |
| 7,594,567 | B2 * | 9/2009 | Sabelstrom | B60B 7/0086 188/218 A |
| 7,661,766 | B2 * | 2/2010 | Davis | B60B 7/0066 301/37.108 |
| 8,382,211 | B2 | 2/2013 | Renius et al. | |
| 8,864,242 | B2 * | 10/2014 | Mengle | B60B 7/04 301/37.102 |
| 2003/0102712 | A1 * | 6/2003 | Fitzgerald | B60B 7/04 301/37.25 |
| 2008/0303338 | A1 * | 12/2008 | Takeda | B60B 7/14 301/104 |
| 2009/0195053 | A1 * | 8/2009 | Kruse | B60B 7/0053 301/6.4 |
| 2009/0236902 | A1 * | 9/2009 | Zibkoff | B60B 1/003 301/104 |
| 2010/0194181 | A1 * | 8/2010 | Noriega | B60B 1/06 301/37.26 |
| 2011/0291255 | A1 * | 12/2011 | Shih | H01L 21/67333 257/680 |
| 2013/0278043 | A1 * | 10/2013 | Wang | B60B 7/08 301/37.39 |

\* cited by examiner

RIM INSERT SYSTEM

CROSS-REFERENCE TO RELATED APPLICATIONS

This application claims foreign priority benefits under 35 U.S.C. §119(a)-(d) to DE 10 2013 202 988.8 filed Feb. 22, 2013, the disclosure of which is hereby incorporated by reference it its entirety.

TECHNICAL FIELD

This disclosure relates to a rim insert system comprising a rim having at least one opening that forms a rim channel that tapers in a funnel-like manner and at least one funnel-like rim insert which can be releasably engaged in the opening.

BACKGROUND

A rim for a motor vehicle wheel generally has an outer rim ring for mounting a tire. A central flange region is secured to the flange of the wheel hub at the center of the rim. A connection region between the center of the rim and the flange has openings which may have different forms.

The openings serve to save weight and may also support the ventilation of the brake disk which is located behind the rim. Air turbulence in the region of the openings may lead to increased energy expenditure. In addition, vehicle owners often perceive the openings to be unattractive and may prefer a different design.

Rim inserts that can be inserted into the openings are known, for example, from DE 20 2009 013 418 U1. The rim inserts described therein are secured in the openings by means of bolts or screws and a U-shaped bracket. This approach to securing rim inserts is relatively complex.

DE 10 2011 107 064 A1 also describes rim inserts that are retained in the rim by means of a screw connection and are further secured by means of a dual-sided adhesive strip. These rim inserts have individual catch elements or catch arms that engage catch projections behind an internal edge of the opening. The length of the catch arms must be precisely adapted to the depth of the openings so that the rim inserts are securely retained and have no play. The rim inserts are secured by securing rings that are pushed onto the catch arms at the rear side of the rims. This variant is also complex and disadvantageous in this regard.

This disclosure is directed to overcome the above noted disadvantages and other problems as summarized below.

SUMMARY

A rim insert system is disclosed that includes rim inserts that are retained in the openings in a secure but releasable manner. The rim inserts are intended to be readily assembled and disassembled.

Accordingly, the rim inserts have at least two catch elements that perform different functions. The first catch element is in abutment with an inclined portion of an inner opening edge of the rim channel, that is to say, an edge arranged at the side of the brake disk. The inclined portion and the inner face of the rim channel form an angle of approximately from 200-240°. The free end or the catch projection of the first catch element is accordingly constructed in an angled manner.

The outer face of the rim insert is in abutment with the inner face of the rim channel. The catch projection forms an angle of approximately from 200° to 240°. Therefore, the rim channel and also the rim insert initially taper in terms of depth and then expand again at least in the region of the first catch element. The internal opening edge and the rim channel form the inclined portion.

The abutment of the first catch element against the inclined portion avoids unwanted noise. The catch projection does not have to be precisely engaged behind the opening edge and the associated catch arm is not required to have a precise length.

The catch projection abutting the inclined portion is convex to facilitate insertion of the rim insert.

In contrast to the first catch element, the second catch element is engaged behind the opening edge to retain the rim insert in a positive-locking manner. To this end, the inner face of the rim channel and the catch projection of this catch element form an angle of from approximately 80° to 140° and the opening edge is constructed accordingly. An angle of less than 90° has the advantage that the catch element, on the one hand, is securely engaged but, on the other hand, the introduction of the rim insert at an angle of less than 90° is simple because the catch projection extends in the insertion direction inclined to the rear.

The first catch element and the second catch element, that has a positive-locking connection, are arranged opposite each other.

The peripheral catch edge may have four interruptions that produce four catch elements. The width of all the interruptions is less than the total width of all the catch elements by at least 30%.

The mass of the rim inserts may be between 10 g and 30 g, advantageously 20 g. From one to ten rim inserts may be provided, depending on the type of rim. The rim inserts can be constructed and used for existing rim types and also can be used in the construction of new rim types.

The rim inserts can be disassembled in a rapid and simple manner by pressing together the catch elements. This may be advantageous for cleaning the rims and also for replacing the rim inserts. The catch element that engages in a positive-locking manner is disengaged from the catch element that is in abutment with the inclined portion and is then simply pulled out.

A plurality of catch elements are provided in abutment with inclined portions and a plurality of catch elements are provided that engage in a positive-locking manner.

The rim inserts are retained in a secure manner with the tapered portion of the rim inserts being smaller than the tapered portion of the rim channel. The rim inserts are slightly compressed during insertion into the opening and are retained in the opening in the inserted state by pretensioning.

The rim inserts may be made of a colored material that is capable of being painted and coated.

The shape of the rim inserts, in particular with closed rim inserts, may improve the aerodynamics. The term closed is intended to be understood to mean that the funnel-like rim channel is closed by means of a covering face to prevent air from penetrating from the outer side into the channel. The fuel consumption of the vehicle is thereby reduced. Particularly good results are achieved with concave covering faces that create a 'golf ball effect" that has particularly favorable aerodynamic performance. However, the covering faces may also be constructed in a planar or convex manner.

The inner surface of the rim insert channel may selectively redirect air flowing into the rim insert through the rim channel in the direction of the brake disk for cooling. The inner surface of the channel may have at least one groove or rib for redirecting air flow and, in particular, fan-like ribs may be provided.

The rim insert may have a minimally smaller length along a longitudinal axis of the rim channel than the opening. The smaller length of the rim insert results in a rim surface protruding in a minimal manner with respect to the outer edge of the rim insert to protect the rim insert.

This disclosure is explained in greater detail below with reference to the appended Figures.

DETAILED DESCRIPTION

The illustrated embodiments are disclosed with reference to the drawings. However, it is to be understood that the disclosed embodiments are intended to be merely examples that may be embodied in various and alternative forms. The figures are not necessarily to scale and some features may be exaggerated or minimized to show details of particular components. The specific structural and functional details disclosed are not to be interpreted as limiting, but as a representative basis for teaching one skilled in the art how to practice the disclosed concepts.

Figure 1:
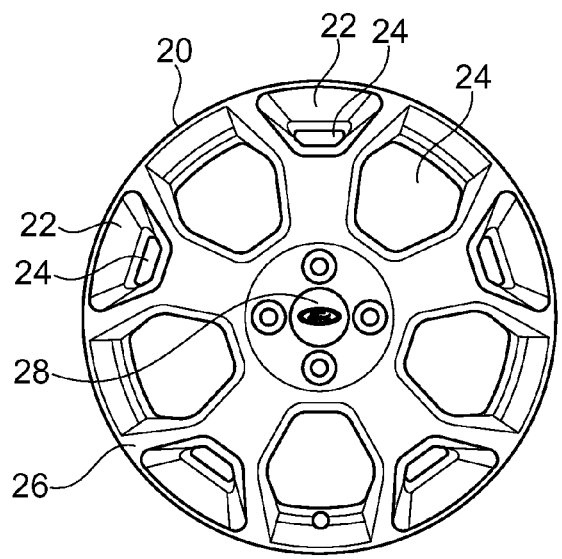
FIG. 1: is a side view of a rim with rim inserts.
Figure 2:
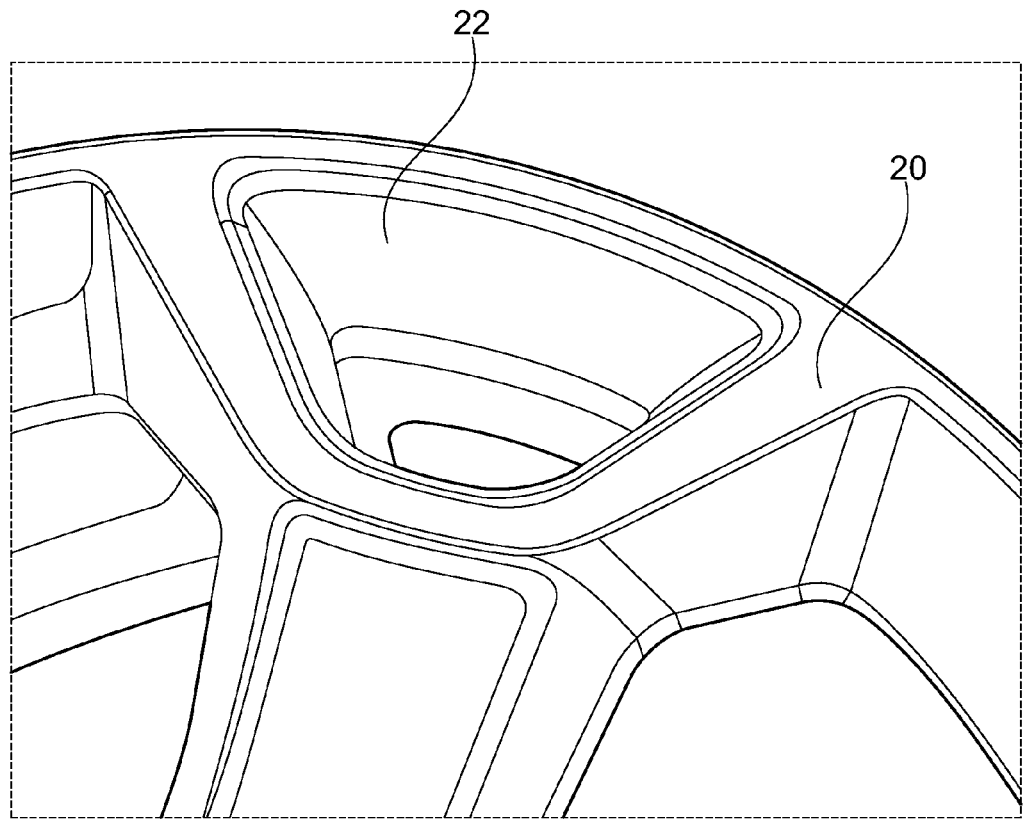
FIG. 2: is an enlarged view of a rim insert in an opening of a rim.
Figure 3:
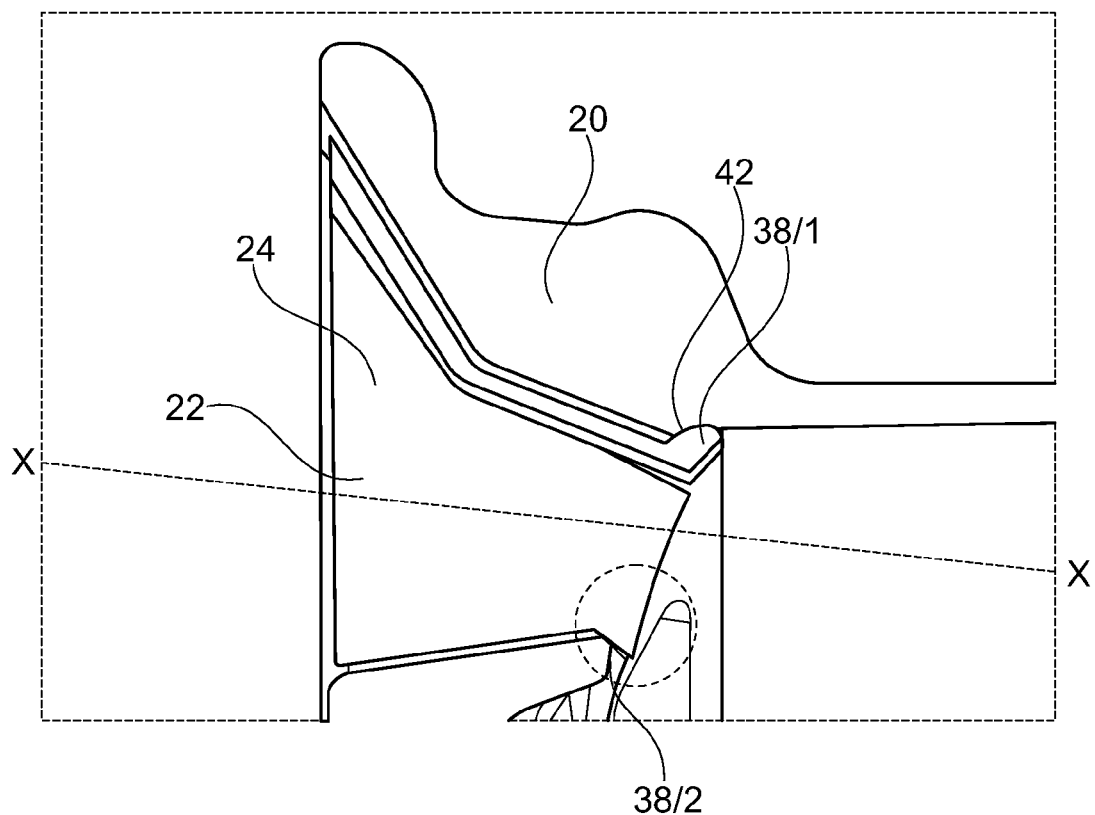
FIG. 3: is a schematic cross-section of the rim insert in the rim.

In FIGS. 1 to 3, a rim 20 having openings 24 which are arranged between an outer rim ring 26 and a flange region 28 can be seen. An advantageous embodiment of a rim insert 22 is in each case inserted into the openings 24.

As can be seen in particular in FIG. 3, an inner face of the opening 24 forms a funnel-like channel 30. The rim insert 22 is also constructed in a funnel-like manner and is in abutment with the outer side thereof against the inner face of the rim channel 30.

The rim channel 30 and the rim insert 22 taper from the outer sides thereof towards the inner sides thereof along a longitudinal axis X-X, the tapering in the embodiment shown being constructed so as to first be greater and then smaller from the outer side to the inner side. It can also clearly be seen that the rim 20 protrudes in a minimal manner at the outer side with respect to the rim insert 22. In the operating state, a brake disk which is not shown here is generally arranged at the inner side of the rim 20.

Figure 4:
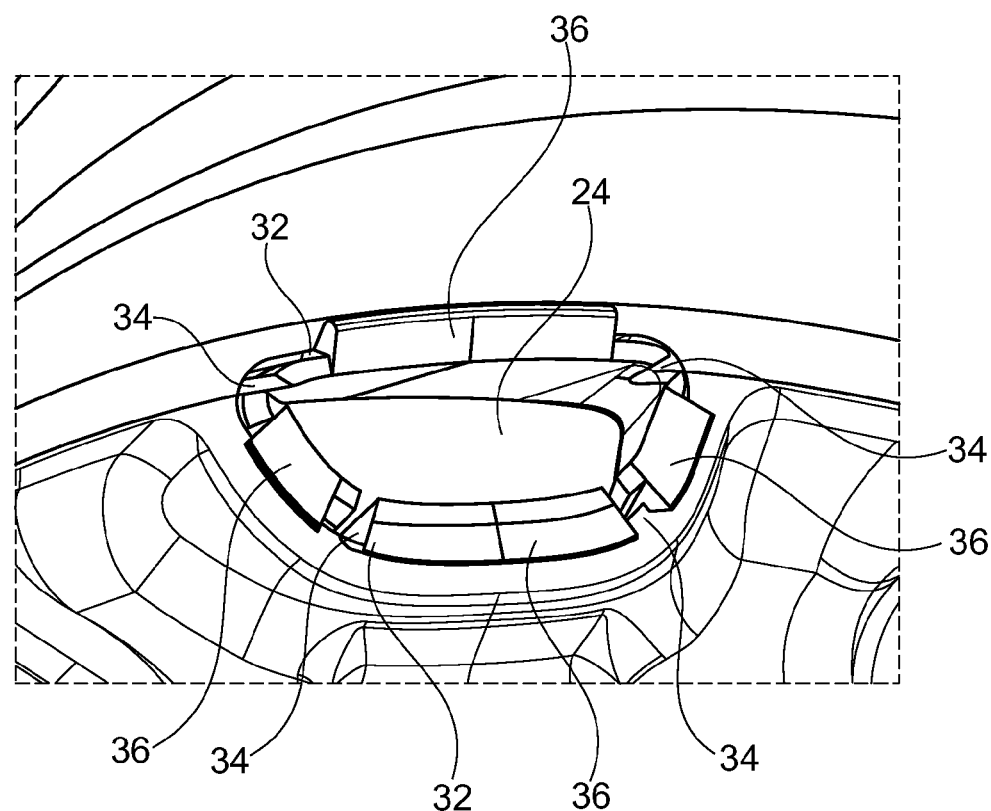
FIG. 4: shows an inserted rim insert when viewed from the rear side of the rim.

FIG. 4 shows the inserted rim insert 22 from the rear, that is to say, when viewed from the rear side of the rim 20. The rim insert 22 has a peripheral catch edge 32. The peripheral catch edge has four interruptions 34, whereby four catch elements 36 are produced. The catch elements 36 each have catch projections 38/1 and 38/2 (shown in FIG. 5) that engage behind an opening edge 40 of the rim channel 30.

The total width of all the interruptions 34 in the peripheral direction along the opening edge 40 falls below the total width of all the catch elements 36 in the peripheral direction along the opening edge 40 by at least 30%. The rim inserts 22 may be quickly and simply disassembled by pressing together the catch elements 36.

FIGS. 4 to 8 show the construction of the two catch elements 36 that are substantially diametrically opposite each other that are designed to cooperate with the opening edge 40 or the rim channel 30 in the region of the catch elements 36. For better understanding of the operating method, reference is also made in particular to FIG. 3.

A first catch projection 38/1 is in abutment with an inclined portion 42 which forms the inner face of the rim channel 30 or the opening edge 40. The rim channel 30 which first tapers in a funnel-like manner expands again in this region. The first catch projection 38/1 is in abutment with the inclined portion 42, and the inner face of the rim channel 30 forming an angle of approximately from 200°-240° in cross-section. The free end or the catch projection 38/1 is correspondingly angled with the outer face of the rim insert 22 in abutment with the inner face of the rim channel 30 and the catch projection 38/1 also forming an angle of approximately from 200° to 240°.

The first catch projection 38/1 or the abutment face 44 that abuts against the inclined portion 42 may also be constructed in a convex manner (cf. FIG. 8) in order to facilitate introduction of the rim insert.

The inclined engagement facilitates compensation for production tolerances with respect to length differences along the longitudinal axis X-X.

Figure 5:
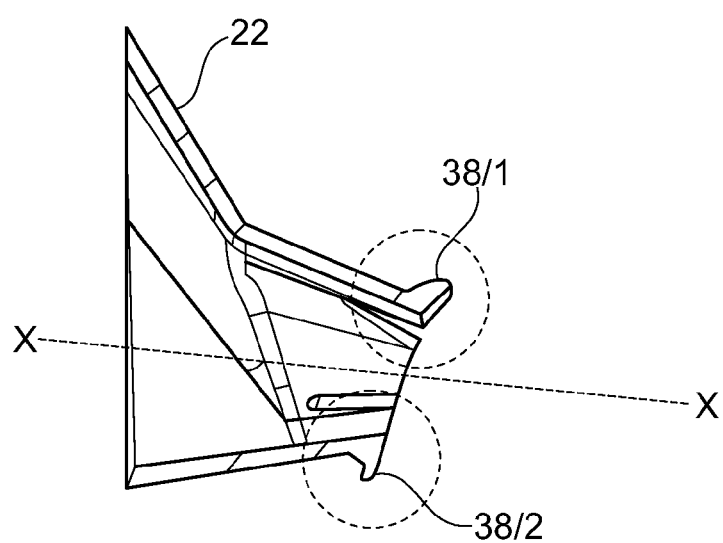
FIG. 5: is a cross-section of the rim insert.
Figure 6:
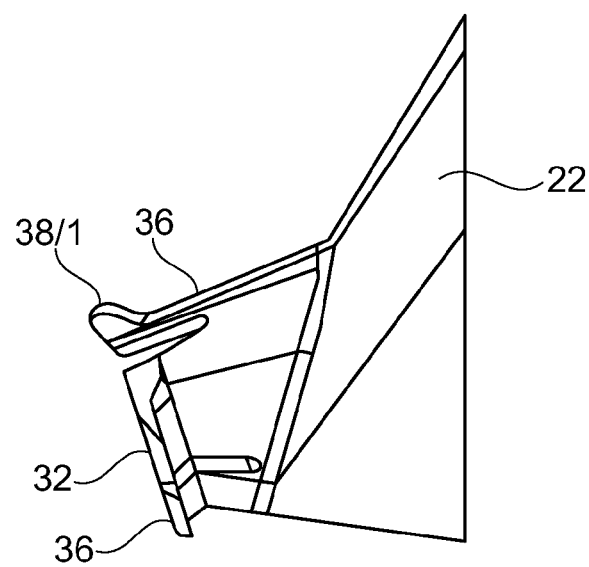
FIG. 6: is a side view of the rim insert.
Figure 7:
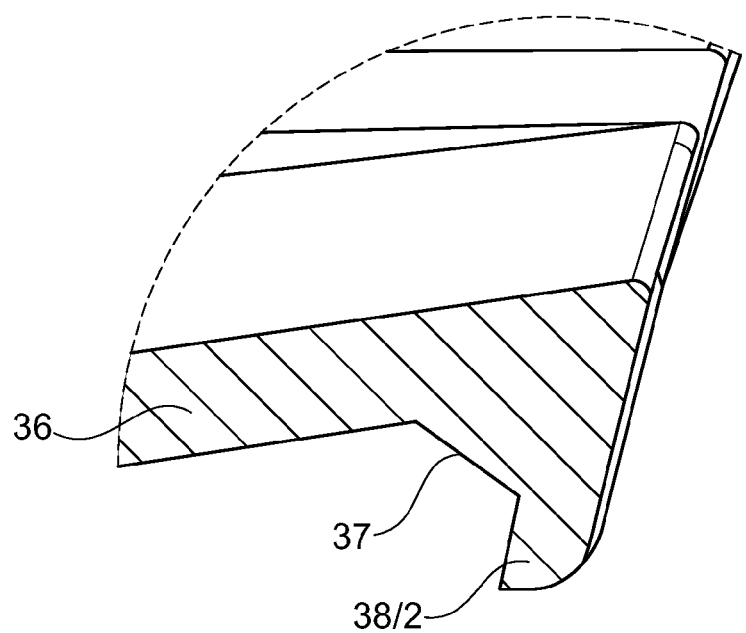
FIG. 7: is an enlarged view of the region B from FIG. 5,
FIG. 8: is an enlarged view of the region C from FIG. 5.
Figure 8:
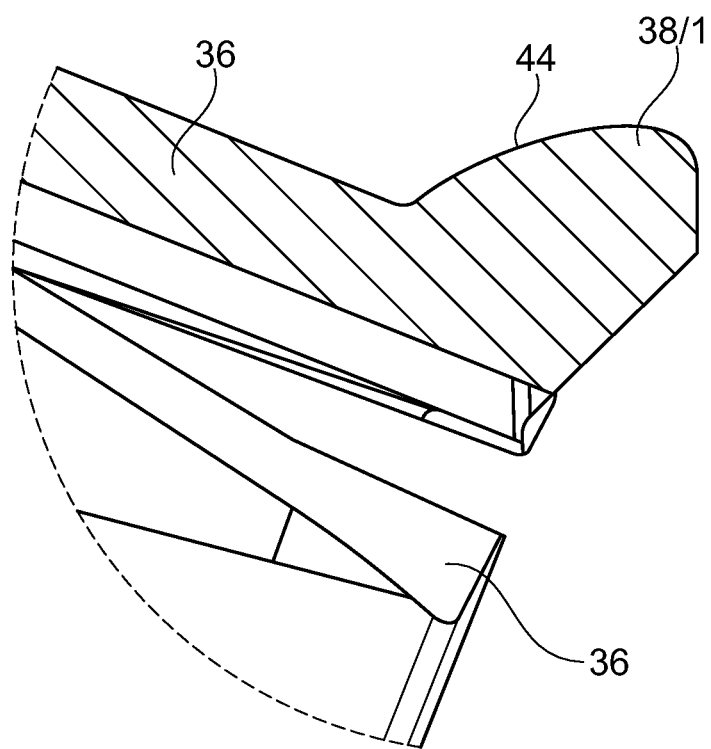

FIGS. 3, 5 and 7 show the second catch projection 38/2 that is arranged substantially opposite the first catch projection 38/1. The second catch projection 38/2 engages behind the opening edge 40 in a positive-locking manner and secures the rim insert 22 against undesirable release. The inner face of the rim channel 30 and the opening edge 40 are oriented at an angle of approximately from 270° to 290°, the opening edge 40 and the second catch projection 38/2 are constructed accordingly in this region. In the embodiment shown, an angle of approximately 280° is provided, to facilitate the introduction of the rim insert 22 since the second catch projection 38/2 is directed in an oblique manner towards the rear during insertion in the movement direction. The catch projection 38/2 oriented at an angle of more than 90°. Furthermore, the second catch projection 38/2 has a plateau 37 which additionally secures the rim insert against undesirable release.

The invention is not limited to the embodiment shown. For example, more or fewer catch elements may also be provided.

The embodiments described above are specific examples that do not describe all possible forms of the disclosure. The features of the illustrated embodiments may be combined to form further embodiments of the disclosed concepts. The words used in the specification are words of description rather than limitation. The scope of the following claims is broader than the specifically disclosed embodiments and also includes modifications of the illustrated embodiments.

What is claimed is:

1. A rim insert system comprising:
   a rim having at least one opening which forms a rim channel which tapers in a funnel-like manner; and
   at least one funnel-like rim insert which can be releasably engaged in the opening, wherein the rim insert has a peripheral catch edge which is divided by at least two interruptions into individual catch elements which engage behind an opening edge of the rim channel in an inserted position, wherein a first catch element has a convex abutment face in abutment with an inclined portion of the opening edge and the inclined portion and an inner face of the rim channel form an oblique angle relative to a longitudinal axis, a second catch element which is substantially diametrically opposed to the first catch element and which engages behind the opening edge in a positive-locking manner, wherein the inner face of the rim channel and the opening edge form an acute angle relative to the longitudinal axis.

2. The rim insert system as claimed in claim 1, wherein four interruptions and four catch elements are formed.

3. The rim insert system as claimed in claim 1, wherein a total width of all the interruptions in a peripheral direction along the opening edge falls below a total width of all the catch elements in the peripheral direction along the opening edge by at least 30%.

4. The rim insert system as claimed in claim 1, wherein the rim protrudes with respect to the rim insert at an outer side thereof.

5. The rim insert system as claimed in claim 1, wherein the inner face of the rim channel and the opening edge form an angle of approximately 270°.

6. The rim insert system as claimed in claim 1, wherein the rim channel is closed by means of a covering face in such a manner that air flow from an outer side is excluded from the rim channel.

7. The rim insert system as claimed in claim 1, wherein an inner surface of the rim channel has at least one groove or rib which directs incoming air through the rim channel.

* * * * *